(12) United States Patent
Sanada et al.

(10) Patent No.: US 7,440,925 B2
(45) Date of Patent: *Oct. 21, 2008

(54) METHOD FOR RENTAL STORAGE SYSTEM

(75) Inventors: Akemi Sanada, Chigasaki (JP); Hideo Tabuchi, Odawara (JP); Toshio Nakano, Chigasaki (JP); Sajio Ishizuki, Odawara (JP); Isamu Kage, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 10/716,471

(22) Filed: Nov. 20, 2003

(65) Prior Publication Data

US 2004/0107148 A1 Jun. 3, 2004

Related U.S. Application Data

(62) Division of application No. 09/987,815, filed on Nov. 16, 2001, now Pat. No. 6,868,398.

(51) Int. Cl.
*G06F 9/44* (2006.01)
(52) U.S. Cl. ........................................ 705/52
(58) Field of Classification Search ............... 705/26, 705/30, 28, 52, 22, 51
See application file for complete search history.

(56) References Cited

U.S. PATENT DOCUMENTS

| | | | | |
|---|---|---|---|---|
| 4,827,508 | A | * 5/1989 | Shear | ............... 705/53 |
| 5,155,680 | A | 10/1992 | Wiedemer | |
| 5,367,704 | A | 11/1994 | Hasuo et al. | |
| 5,388,211 | A | 2/1995 | Hornbuckle | |
| 5,689,476 | A | 11/1997 | Leach | |
| 5,761,651 | A | 6/1998 | Hasebe et al. | |
| 5,901,228 | A | * 5/1999 | Crawford | ............... 705/34 |
| 5,949,415 | A | * 9/1999 | Lin et al. | ............... 715/740 |

(Continued)

FOREIGN PATENT DOCUMENTS

JP 01248725 10/1989

(Continued)

OTHER PUBLICATIONS

Fred Moore. First ISP, Then ASP Now SSP!. May 2000. Computer Technology Review.*

(Continued)

*Primary Examiner*—F. Zeender
*Assistant Examiner*—Garcia Ade
(74) *Attorney, Agent, or Firm*—Mattingly, Stanger, Malur & Brundidge, P.C.

(57) ABSTRACT

Reduction of the initial investment cost of a user of a storage system can be realized, and the user of the storage system can easily perform timely addition for a short time. In a preferred embodiment, a method for renting and charging the storage system includes the steps of: reading a used volume from a use management table held in the storage system; and sending the read used volume from the storage system to a charging system. Preferably, the storage system has means for allowing an owner to grasp that a user starts using the storage system, wherein the owner rents to the user a storage system having a disk volume, a cache volume, and other components more than the user's increase intension, charges for a used volume of the user for a fixed period, and reviews the added volume and the charged cost on the fixed period basis.

18 Claims, 12 Drawing Sheets

U.S. PATENT DOCUMENTS

| | | |
|---|---|---|
| 6,014,651 A | 1/2000 | Crawford |
| 6,243,450 B1 | 6/2001 | Jansen et al. |
| 6,411,943 B1 * | 6/2002 | Crawford .................... 705/400 |
| 6,748,502 B2 * | 6/2004 | Watanabe et al. ........... 711/158 |
| 6,829,593 B1 * | 12/2004 | Ritter et al. ................... 705/51 |
| 6,920,153 B2 * | 7/2005 | Ellis et al. ................... 370/475 |
| 7,043,458 B2 * | 5/2006 | Kimura ...................... 705/400 |
| 2002/0138691 A1 * | 9/2002 | Yamamoto et al. .......... 711/112 |

OTHER PUBLICATIONS

Brad O'Neill. What to expect from SSPs. Aug. 2000. Unisys World.*

* cited by examiner

MANAGEMENT TABLE OF A DISK CONTROL UNIT OF A STORAGE SYSTEM

| ON-DEMAND VOLUME | ON-DEMAND FLAG ATTRIBUTE (SET/RESET) | RESET TIME (DATE AND TIME) |
|---|---|---|
| xxGB | RESET | yymmddhhmmss |
| xxGB | RESET | yymmddhhmmss |
| xxGB | SET | |
| xxGB | SET | |
| ⋮ | ⋮ | ⋮ |
| xxGB | SET | |

INFORMATION FLOW OF A STORAGE SYSTEM AND AN INFORMATION DISPLAY TERMINAL AT RESET OF AN ON-DEMAND FLAG

FIG. 4

INFORMATION FLOW OF A STORAGE SYSTEM AND AN INFORMATION DISPLAY TERMINAL AT CONFIRMATION (INQUIRING) OF INFORMATION

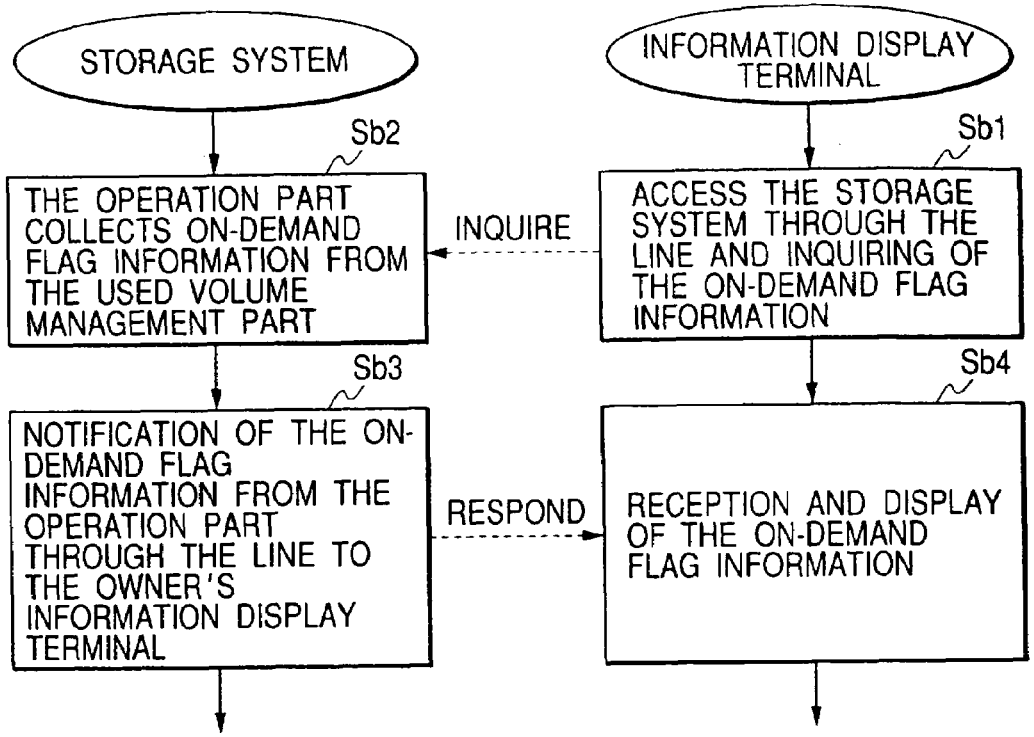

FIG. 5

EXAMPLE OF AN INFORMATION MANAGEMENT TABLE BY USERS OF A STORAGE SYSTEM

|  | USER A | USER B | USER C |
|---|---|---|---|
| USER ID | xxxxxx | xxxxxx | xxxxxx |
| USED VOLUME | xxGB | xxGB | xxGB |
| ADDED VOLUME | xxGB | xxGB | xxGB |
| USE PERIOD | x YEAR/x MONTH/x DAY TO x YEAR/x MONTH/x DAY | x YEAR/x MONTH/x DAY TO x YEAR/x MONTH/x DAY | x YEAR/x MONTH/x DAY TO x YEAR/x MONTH/x DAY |
| USE STARTING DATE | x YEAR/x MONTH/x DAY | x YEAR/x MONTH/x DAY | x YEAR/x MONTH/x DAY |
| ALLOCATED VOLUME | VOL. 1, VOL. 2 | VOL. 3, VOL. 4 | VOL. 5, VOL. 6 |
| USE UNIT COST | x¥/MONTH | x¥/MONTH | x¥/MONTH |

METHOD FOR RENTAL STORAGE SYSTEM

This is a divisional application of U.S. Ser. No. 09/987,815, filed Nov. 16, 2001 now U.S. Pat. No. 6,868,398. This application is related to U.S. Ser. No. 10/422,955, filed Apr. 25, 2003.

FIELD OF THE INVENTION

The present invention relates to a storage system, more specifically, to a charging method based on the used volume of the storage system, the reduced initial investment for a storage system, and easy volume addition of the storage system, and to a storage system for realizing the charging method.

BACKGROUND OF THE INVENTION

With the rapid spread of Internet, the amount of data has been increased suddenly in the computer network market, and opportunities to add a storage system also have risen sharply in order to store the enormous data. A solution which can supply volumes timely to an abrupt demand for volumes centering on IDC (Internet Data Center), the so-called storage on-demand has been desired.

Each time the volume of a storage system is required, it has been necessary to perform a system adding operation. The system adding operation includes maintenance of power source equipment, ensuring of installing space, planning of an introduction schedule, supply and installation of a system, connection test, and delivery of the system to a user. A great deal of time and funds are required, so that the system cannot be easily added.

To reduce the number of addition times, a high-capacity storage system may be introduced at first. To do this, however, this increases the initial introduction cost which is a problem to a user who does not have enough funds. As a known example to such a problem, there is a function of IBM's "ESS capacity upgrade on-demand".

In this function, in addition to the disk volume to be needed initially, an added disk volume (the capacity upgrade on-demand) is mounted for shipment, so that a user can use the added disk volume whenever necessary. A server processor additionally mounted is extended to enable the added disk volume to be used. The storage on-demand function has the merit of instantly adding and using the excessive added disk on customer demand. After introduction, however, a volume for the capacity upgrade on-demand must be purchased within one year.

The customer judges that a disk must be really added, not when the used disk is actually insufficient, but when the unused area of the usable disk is not enough. Naturally, there may be the case that disk addition is instructed when the total unused area is used and added data cannot be written. Since the system, which has already been in a state that data cannot be written thereinto, cannot be operated substantially, the case is late as the timing to add a disk. A system manager must always grasp the system state and sequentially add a disk to the area to be insufficient by the disk on-demand.

The disk on-demand solves the speed problem in that the adding operation can be efficient. In an aspect of a prior investment to be performed by predicting that storage data will be increased in the future, the problem how the wasteful prior investment is avoided still remains. Reduction of the added disk volume may be considered. In this case, however, addition opportunities are increased, which may easily exert some influence onto the system's long-time continuous stable operation. Charging opportunities by the disk on-demand are increased so as to provide a complex fee system.

SUMMARY OF THE INVENTION

To solve the foregoing problems, an object of the present invention is to find a disk addition provision method in order to avoid a wasteful prior investment. Specifically, the object of the present invention is to provide a method in which an owner of a storage system rents the storage system to a user and charges for the used volume of the user for a fixed period, wherein timely volume addition corresponding to the user's addition needs is easily provided to the user for a short time, and a wasteful prior investment is reduced.

Another object of the present invention is to review the volume construction and the charged cost of a storage system on a fixed period basis, to enable addition of optimal hardware such as a disk and a cache memory at the point, and to optimally set the hardware construction.

To achieve these objects, in the present invention, the volume of the storage system can be divided into a basic supplied volume charged for a volume supplied initially to a user (hereinafter, called an initial introduction volume) and an excessive used volume charged for a volume actually used by the user in excess of the basic supplied volume (hereinafter, called an added volume). The storage system has a disk volume, a cache volume, and other elements to construct the storage system more than the user's increase intension, and the user borrows it. An owner of the storage system charges to the user the basic supplied volume and the excessive used volume. Charging for the basic supplied volume is uniform irrespective of the user's actually-used volume. The excessive used volume is charged for the user's used volume for a fixed period.

The initial introduction volume needed by the user is charged from introduction. Charging for the volume more than the increase intension is started to the user's actually-used volume. The unused volume is charged based on a previously concluded contract For this reason, the storage system has means for allowing the owner to grasp that the user starts using the system. In addition, the storage system has means for expanding a used area corresponding to the user's storage system increase intension and means for recognizing the expanded volume.

Further, in the present invention, a disk volume, a cache volume, and other elements to construct the storage system used by the user of the storage system can be expanded into a given period by an arrangement with the user on a fixed period basis within the range of the volume to be added which is previously mounted on the storage system.

Furthermore, in the present invention, in the case that hardware constructing the storage system rented to the user by the owner is doubled, the main side charges for the normal fee and the sub side charges for a cost lower than that of the main side, so as to reduce the user's investment cost to the storage system.

BRIEF DESCRIPTION OF THE DRAWINGS

FIG. 4 is a diagram showing the information flow of the storage system and the information display terminal according to the embodiment of the present invention;

FIG. 5 is an example of an information management table by users of the storage system according to the embodiment of the present invention;

DESCRIPTION OF THE PREFERRED EMBODIMENTS

Embodiments of the present invention will be described hereinbelow with reference to the drawings.

Figure 1:
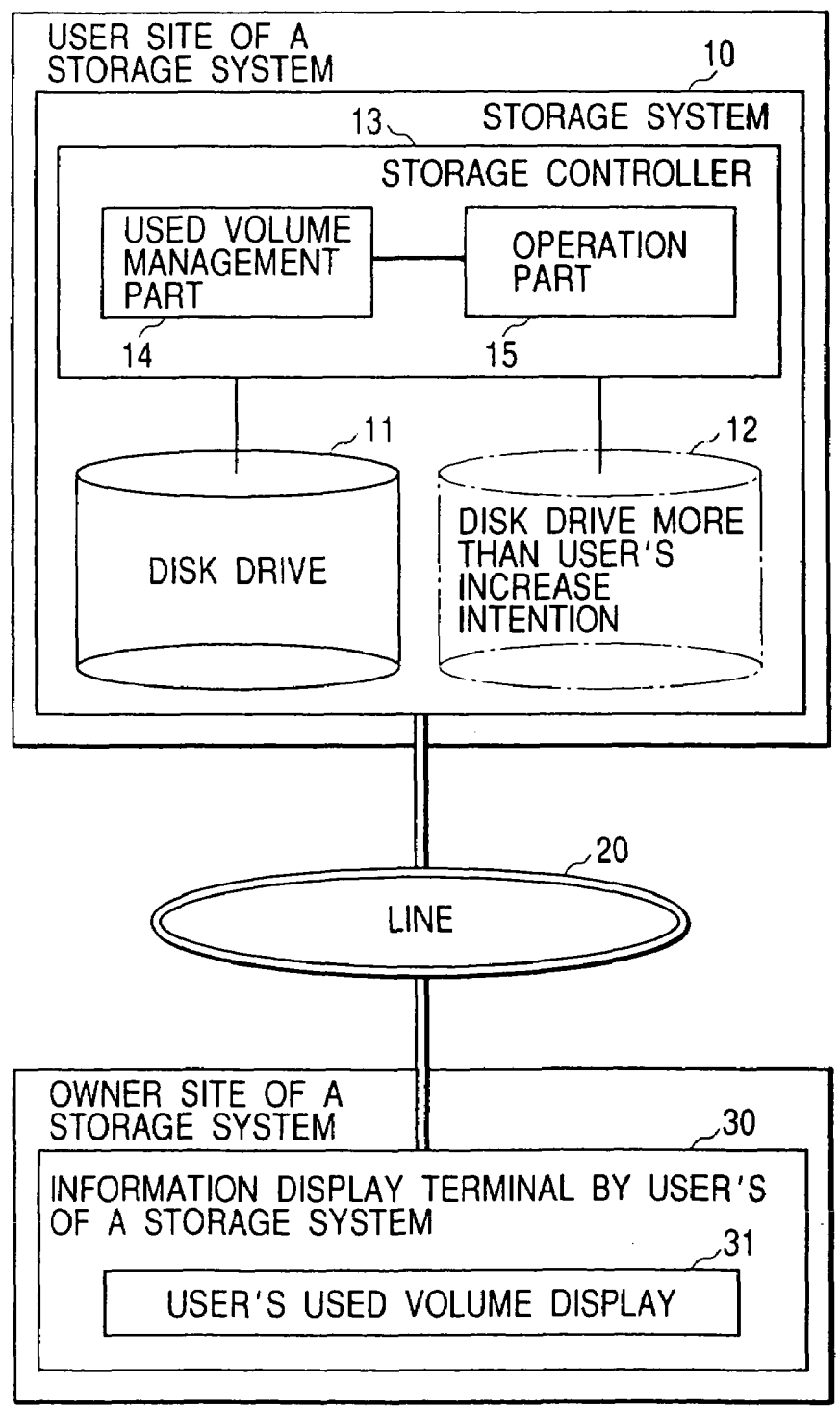
FIG. 1 is a diagram showing the entire system of the present invention.

FIG. 1 is a diagram showing the entire system of the present invention. There are an owner and a user of a storage system. A storage system 10 rented by the owner is connected to a line 20 by the user site. The same line is connected to an information display terminal 30 of the owner site. The storage system 10 is equipped with a disk drive 11 for the initial introduction volume and a disk drive 12 more than the user's increase intension. A storage controller 13 of the storage system 10 has a management part 14 for managing the used disk volume and an operation part 15. The operation part 15 is connected to the storage controller 13 and has an operation panel. More specifically, it is constructed by an SVP 108 shown in the hardware construction of FIG. 10. The information display terminal by users 30 of the storage system has a used volume display part 31 for displaying used volume information by users of the storage system.

The management part 14 of the storage system 10 has a table for managing on-demand flag information. The on-demand flag is reset so as to increase the usable volume. The owner of the storage system 10 uses the operation part 15 at shipment of the system to set an on-demand flag on a given logical volume basis to the disk drive 12 and rents the system 10. The management unit is not limited to the logical volume, and may be an RAID group, a physical volume, or an address.

Figures 2, 3:
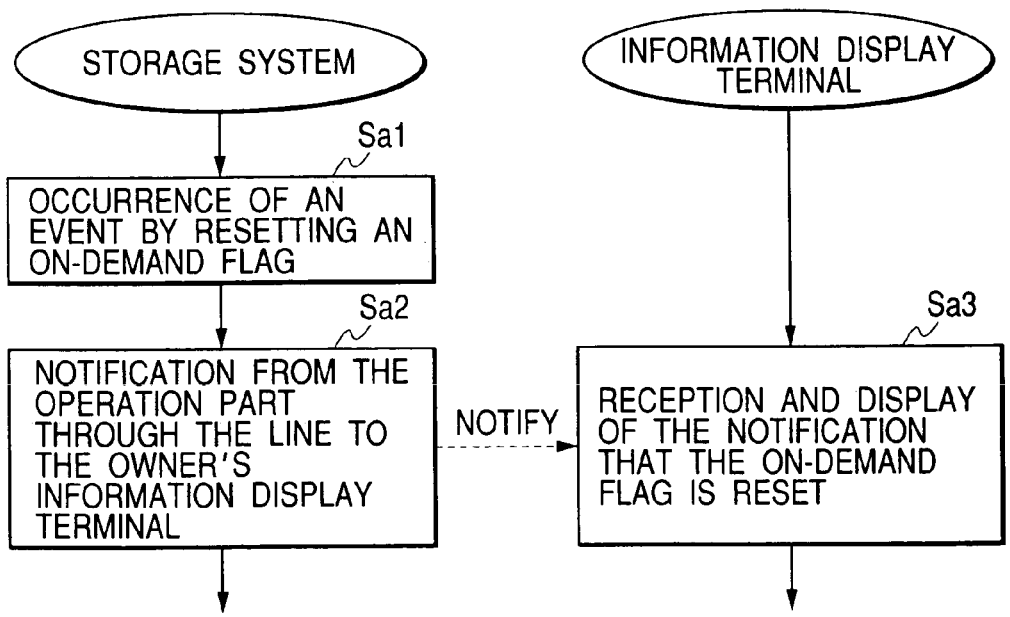
FIG. 2 shows a management table of a disk control unit of a storage system according to an embodiment of the present invention.
FIG. 3 is a diagram showing the information flow of the storage system and an information display terminal according to the embodiment of the present invention.

FIG. 2 shows a table for managing on-demand flag information. This table manages on-demand volumes, on-demand flag attributes, and the reset time.

In the on-demand volume, all the logical volumes to which the on-demand flags are set are managed. The on-demand flag attributes are all "Set" at shipment, and are recorded into the management table as "Reset" when the flag is reset. Once this flag is reset, the initial state cannot be returned. When the flag is reset, the reset date and time to the second are recorded into the management table. Items managed by the table may be volume numbers in place of the on-demand volume, or may include identification information inherent to the user and system use periods.

The operation part 15 shown in FIG. 1 can refer to the table and display that the on-demand flag is being set or reset. The user starts using the disk drive 11 for the initial introduction volume of the rented storage system. When the user wishes to increase the volume since the volume is insufficient for using the disk drive 11 for the initial introduction volume, the operation part 15 of the storage system 10 is used to reset the on-demand flag for the volume to be used and to start using the added volume. In other words, the used area corresponding to the user's volume increase intension can be easily expanded within the range of the added volume previously mounted. The information that the user resets the flag to start using the added volume is notified to the information display terminal 30 of the owner site, so that the owner can recognize the user starts using the added volume.

Notification of the flag reset can be realized by operating the program for that purpose by means of the storage controller 13 of the storage system 10. The dedicated program in part or in whole may be mounted on the information processor of the user side information display terminal and perform reset control via a network. With FIG. 3, the information flow of the storage system 10 and the information display terminal 30 will be described.

The program in the storage controller 13 refers to the on-demand flag management table when the user resets the flag. When in the usable state (the set state), the on-demand flag is reset so that an event occurs. At this time, the management part 14 of the storage system 10 records an on-demand flag attribute and reset time targeted for management information by resetting the on-demand flag. (Step sa1)

With the event of the management part 14, the operation part 15 of the storage system 10 notifies the information that the user resets the flag to start using the on-demand volume to the owner's information display terminal 30 through the line 20. The notification means may be an infrastructure only for this charging system or may use the existing system failure report infrastructure. The notified information may include information managed by the table such as reset time, reset volume, reset volume number, and setting information including identification information inherent to the storage system 10. (STEP sa2)

The information display terminal 30 receives the notification, and the used volume display part 31 displays the used volume information of the user. (STEP sa3).

The information flow with the event of resetting the on-demand flag is described above. When the owner of the storage system wishes to know the use state, the owner can inquire the state. FIG. 4 shows the sequence.

The information display terminal 30 accesses the storage system 10 through the line 20 to inquire on-demand flag information. (STEP sb1)

The operation part 15 of the storage system 10 inquired by the information display terminal 30 collects on-demand flag information from the management table of the management part 14 and sends the information to the information display terminal 30 through the line 20. (STEP sb2) (STEP sb3)

The information display terminal 30 receives the information, and the used volume display part 31 displays the on-demand flag information. (STEP sb4)

Specific examples of the owner and the user of the storage system can be as follows.

(1) An owner is a production and sales maker of the storage system, and a user is a data center operator (IDC (Internet Data Center) or ASP (Application Service Provider).

(2) An owner is a production and sales maker of the storage system, and a user is an end user (a general customer needing storage for actually storing data).

(3) An owner is a data center operator (IDC or ASP), and a user is an end user.

In description of the embodiment of the present invention, this specification describes by assumption that in the case (1), the owner is a production and sales maker of the storage system and the user is a data center operator (IDC or ASP). Other cases can be the same form so that the present invention can be applied. A combination of the owner and user can be other than that of the above cases (1) to (3).

In the case (1), the owner includes a person in charge of service and maintenance and the person in charge of service and maintenance may perform an actual operation. For example, upon the user's request, the person in charge of service and maintenance may substitutably perform an operation for resetting the on-demand flag in the presence of the user.

When in the case (2), the owner is a data center operator and the user is an end user, storage is supplied to plural end users. The used volume must be managed for each of the end users. The management may be performed on a bookkeeping base, or dedicated software can be developed to manage the used volume by the program.

FIG. 5 shows an example of a management table. The managed contents include a user ID, a used volume, an added volume, a use period, a use starting date, an allocated volume, and a use unit cost.

Figure 6:
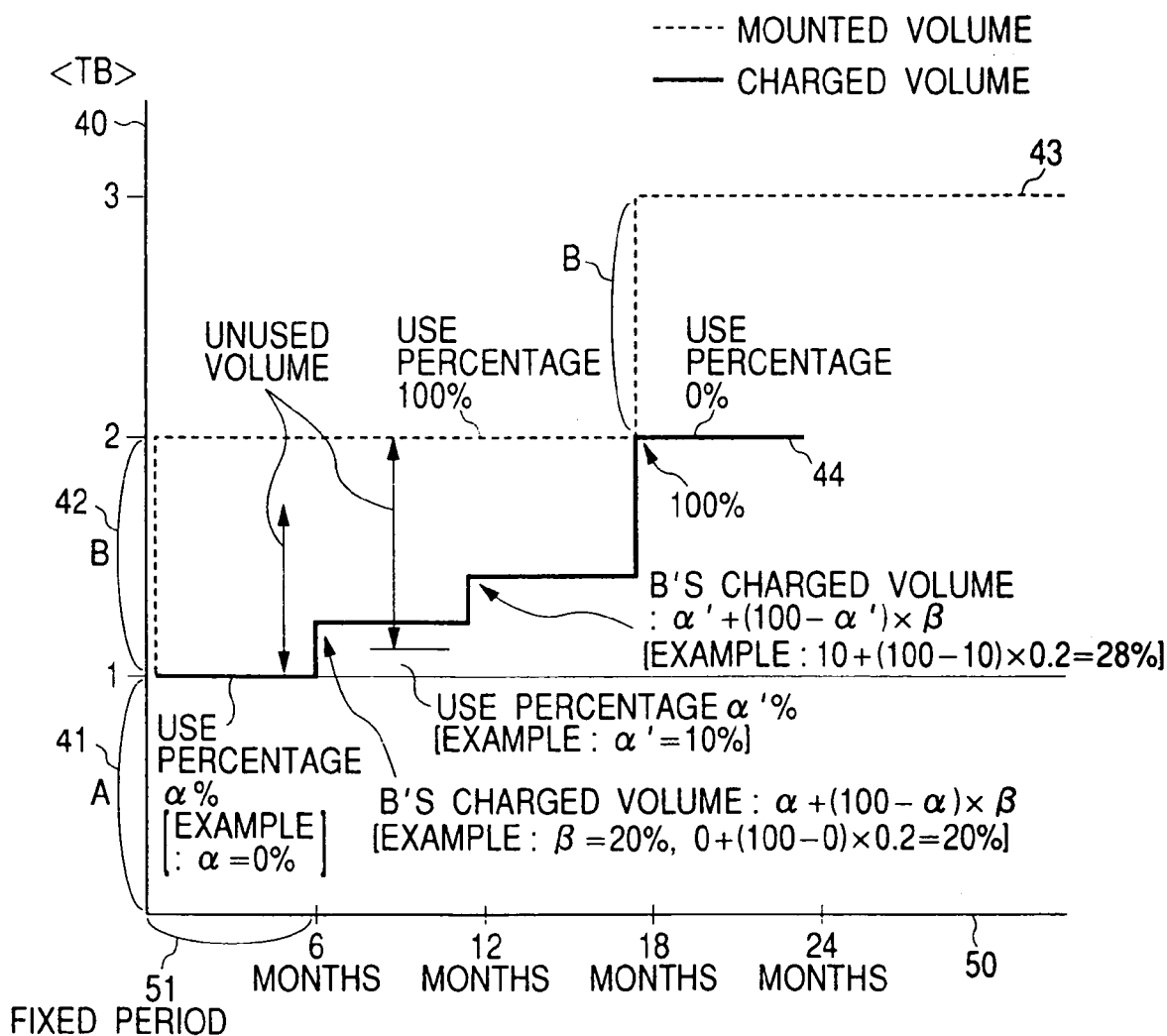
FIG. 6 is a diagram showing the charged volume transition to the disk volume of the storage system showing one embodiment of the present invention.

FIG. 6 shows one embodiment of the present invention. In a method in which the owner of the storage system rents the storage system to the user based on a volume plan for a certain period and charges for the user's used volume, the disk mounted volume of the storage system and the charged volume transition are shown.

In FIG. 6, a graph vertical axis 40 indicates the disk volume of the storage system and a graph horizontal axis 50 indicates time elapsed since the owner of the storage system rents the storage system to the user. A volume 41 indicated by A is an initial introduction volume of the storage system. A volume 42 indicated by B is an added volume on a fixed period 51 basis. A volume 43 indicated by the broken line is a mounted volume. At initial introduction, a volume obtained by adding A41 to an added volume B42 on the first fixed period 51 basis is supplied. The initial introduction volume A41 as a charged volume is charged to the user of the storage system for at least 12 months. The added volume B42 is not charged for the first fixed period 51 after introduction regardless of whether the added volume B42 storage system is used or unused. The added volume B42 is charged after the fixed period 51 elapses.

A charged volume 44 is reviewed on the fixed period 51 basis, and a monthly charged cost is decided based on the volume 44 and a predetermined volume unit cost per month.

Used percentages $\alpha\%$ and $\alpha'\%$ indicate ratios of the used volume excluding the initial introduction volume A41 after the fixed period 51 to the added volume B42. In the presence of an unused volume after the fixed period 51, the charging percentage to the unused volume is $\beta\%$.

In the charged volume 44, when it is confirmed that the whole added volume B42 is used after the fixed period 51 elapses, the initial introduction volume A41 and the whole added volume B42 are charged. When there is an unused volume of the existing added volume B42 after the fixed period 51 elapses, the total percentage obtained by adding "the used percentage $\alpha\%$ at the point" to "a value obtained by multiplying the unused percentage of the added volume B42 by a certain percentage $\beta\%$" is charged for the next fixed period 51. The initial introduction volume A41 is also charged. After the fixed period 51 elapses, the added volume B42 for the next fixed period 51 is added. In the same manner, the added volume B42 added is not charged for the next fixed period 51, and is charged after the next fixed period 51 elapses.

The volume construction and the charged cost are reviewed on the fixed period basis. The user can add optimal hardware at the point. For example, a large-volume disk or a large-volume cache memory which has not been produced at the contract can be mounted.

In this embodiment, in FIG. 6, the owner of the storage system rents the storage system to the user for 3 years, the initial introduction volume A41 is 1 TB (tera byte), the added volume B42 on a fixed period basis is 1 TB, and the fixed period 51 for performing volume addition and review is 6 months. FIG. 6 also shows that the used percentage $\alpha$ for first 6 months is 0%, the used percentage $\alpha'$ for the next 6 months is 10%, and the fixed charging percentage $\beta\%$ to the unused percentage is 20%. The values are one example, and the values are varied by the previous arrangement of the owner and the user of the storage system.

Figure 7:
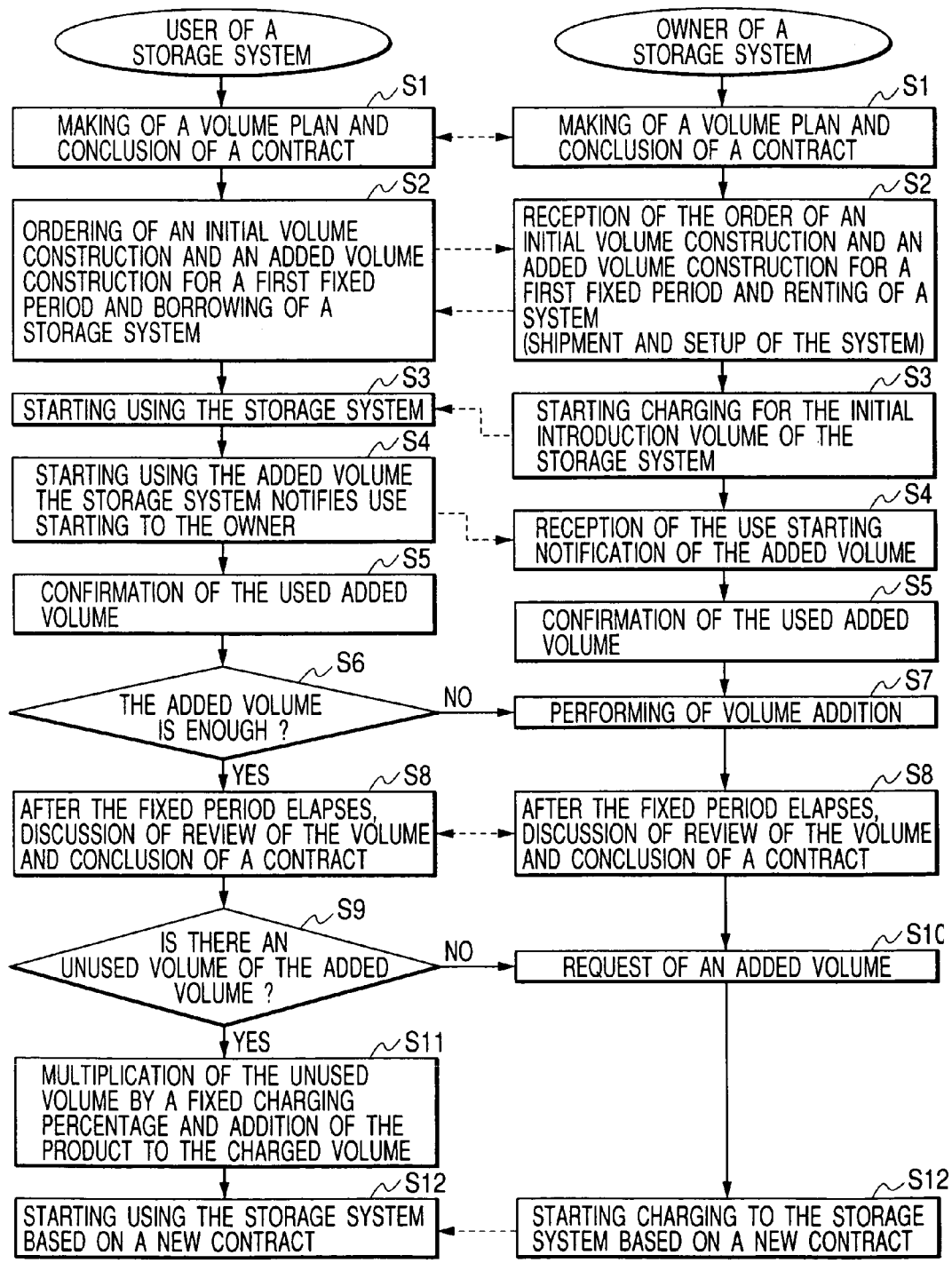
FIG. 7 is a flowchart of a charging method to the disk volume of the storage system according to the embodiment of the present invention.

With FIGS. 6 and 7, the flow and the specific example of the charging method to the storage system will be described.

In the present invention, the owner and the user of the storage system make a volume plan for several years since supply of the system and conclude a renting and borrowing contract of the storage system. By way of example, in a three-year volume plan, the initial introduction volume A41 is 1 TB, the volume and cost review period 51 is 6 months, and the added volume B42 on a fixed period 51 (6 months) basis is 1 TB. When there is an unused volume after the fixed period 51 (6 months) elapses, the charging percentage to the unused volume is 20%. Assuming that the user uses the storage system for at least 3 years, it is desirable to conclude the contract. At the contract, a monthly charged cost is decided. At this time, 1 TB of the initial introduction volume A41 as a charged volume is charged for at least 12 months. 1 TB of the added volume B42 is not charged for first 6 months after introduction regardless of whether the added volume B42 is used or unused. It is charged after 6 months elapse. (STEP S1).

The user orders to the owner of the storage system a storage system having a total volume of 2 TB of the initial introduction volume 1 TB and the added volume 1 TB for the next 6 months. The owner who has received the order ships a system of the construction for setup and rents it to the user. At this time, the owner constructs and sets the system so that the user automatically notifies the user starting of the added volume. For rental, the storage system includes, not only a disk drive, but also hardware required for the next 6 months (a disk drive, a housing mounting the disk drive, a cache memory and other components to construct the storage system such as a storage medium, a controller, a host interface, a relay between the storage systems). (STEP S2)

The user starts using the storage system, and the owner starts charging for the storage system. For the first fixed period 51 (6 months), 1 TB of the initial introduction volume A41 is a charged volume. (STEP S3)

The used volume of the user can be expanded into a given period by the user within the range of 1 TB of the previously-mounted added volume B42. When the previously-mounted added volume is started to use, the on-demand flag may be reset. The storage system has means for notifying to the owner that the user starts using the added volume B42. When the user resets the on-demand flag, the use starting information is notified to the owner, and the owner can recognize the use starting. The user uses the operation panel connected to the storage system to display the used volume, and can always confirm the used volume. (STEP S4) (STEP S5)

When the used volume of the fixed volume 51 (6 months) is insufficient in 1 TB of the added volume B42, another addition is performed. The addition including the volume with the added equipment is completed. After completion of this addition, irrespective of the used volume, the initial introduction volume A41 and the added volume B42 are committed as the charged volume for 12 months. The added volume in excess of this is not charged. When it is not insufficient, the use is continued. (STEP S6) (STEP S7) (STEP S8)

Each time the fixed period 41 (6 months) elapses, the charged volume 44 is reviewed.

The owner and the user of the storage system discuss deciding a use fee based on the charged volume 44 and the monthly volume unit cost to conclude a contract to change the use fee. In the charged fee 44, when it is confirmed that the whole 1 TB of the added volume B42 is used after 6 months elapse, the total volume of 2 TB of 1 TB of the initial introduction volume A41 and 1 TB of the added volume B42 is charged. 1 TB of the added volume B42 is added so that the mounted volume of the storage system is 3 TB. (STEP S9) (STEP S10) (STEP S11)

On the other hand, when 1 TB of the existing added volume B42 is not used at all after the fixed period 51 (6 months) elapses, that is, when the used percentage is 0%, a percentage obtained by adding "the used percentage 0% at the point" to "a value obtained by multiplying the unused percentage (100-0) % of the added volume B42 by the charging percentage 20% to the unused volume decided at the contract" is charged to 1 TB of the added volume B42 for the next 6 months. In other words, "1 TB of the initial introduction volume A41"+ "1 TB of the added volume B42×(0%+(100-0)%×20%)" makes "1 TB+1 TB×0.2=1.2 TB".

After the next fixed period 51 (6 months) elapses, when the used percentage is 10% in 1 TB of the exiting added volume B42, the same calculation is performed. The total charged volume for the next 6 months is "the initial introduction volume 1 TB"+"the added volume 1 TB×(10%+(100−10)%× 20%)" makes "1 TB+1 TB×0.28=1.28 TB".

When the unused volume of the added volume B42 is large, addition of a new added volume is not performed in this example. Without being limited to this, it may be decided based on the user's use volume increase intension for the next 6 months.

Thereafter, the user uses the storage system based on a new contract, and the owner charges for the charged volume after review to review it on the fixed period 51 (6 months) basis (STEP S12)

The disk volume is described above as an example. The cache volume and other components to construct the storage system (a housing mounting the disk drive, a storage medium constructing the storage system, a controller, a host interface, and a relay between the storage systems) are reviewed on the fixed period basis and are added for reflection on the charged cost.

The used volume is described with the case that it is charged after the fixed period elapses. Upon notification of the use starting to the owner, the charged cost may be changed. When there is an unused volume after the fixed period elapses, the charging percentage to the unused volume is 20%. This value is arranged between the owner and the user, and the whole unused volume may be charged. The money amount more than the owner's depreciation may be charged to the user as a user's burden. When the user does not use the storage system for the fixed period, the user may accept the storage system assuming that the user pays the corresponding compensation to the owner.

When the hardware constructing the storage system is doubled, the main side charges for the normal fee, and the sub side charges a cost lower than that of the main side. This allows the user to use a reliable storage system at a lower cost.

Figure 8:
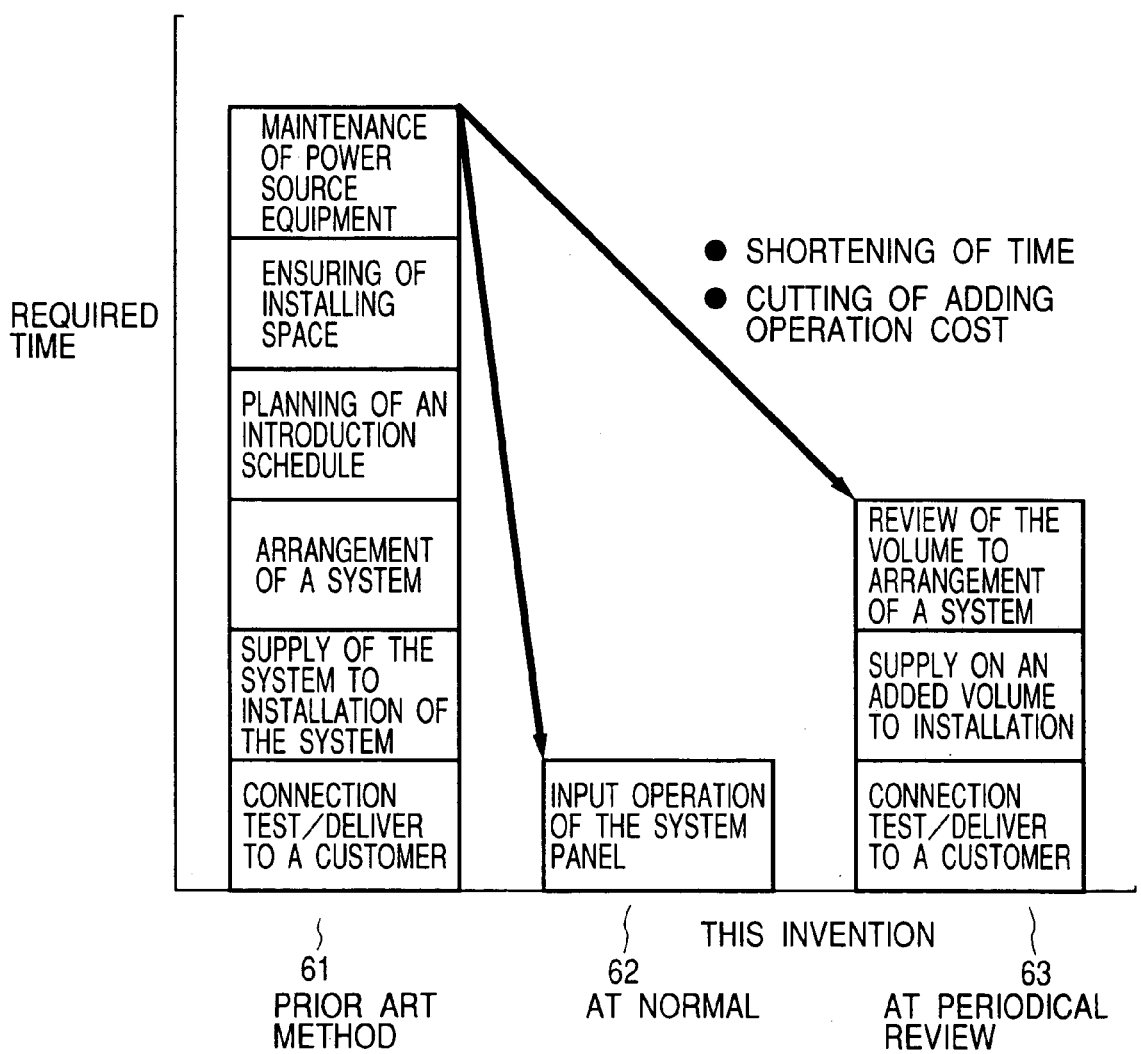
FIG. 8 is a diagram showing time required for volume addition to the storage system according to the embodiment of the present invention and the prior art.
Figure 9:
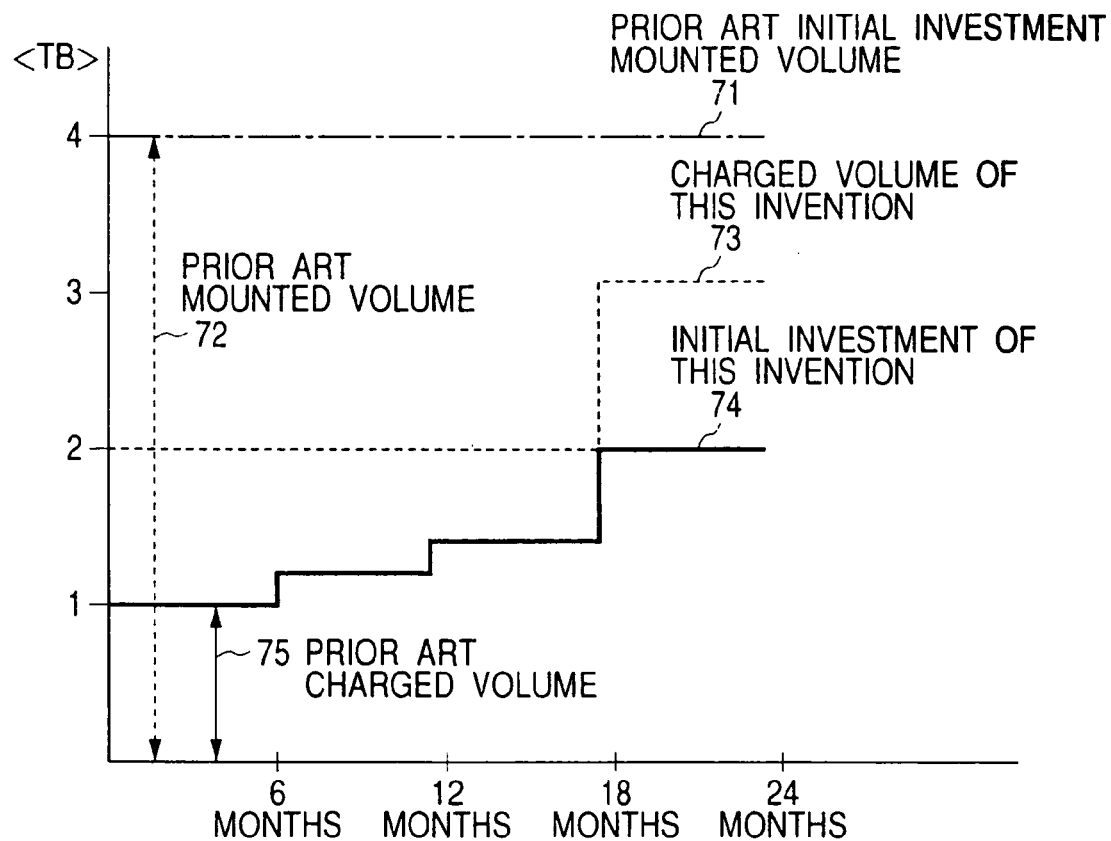
FIG. 9 is a diagram showing the initial invested volumes to the storage system according to the embodiment of the present invention and the prior art.

With FIGS. 8 and 9, time required for volume addition and the initial investment cost of the charging method applying the present invention are compared with those of a prior art charging method.

FIG. 8 shows time required for volume addition. In a prior art method 61, a system adding operation must be performed each time the volume of the storage system is needed. The system adding operation includes maintenance of power source equipment, ensuring of the installing space, planning of an introduction schedule, supply and installation of the system, connection test, and deliver of the system to the user, and a great deal of time and fund are required. On the other hand, in the case of the storage system according to the present invention, a volume required by the user of the storage system is planned for several years, and a system with the volume more than the user's addition intension is rented. At normal 62, when the volume is insufficient, the operation panel of the installed system may be used to extend the usable volume. At review on the fixed period basis 63, the volume is reviewed, and addition of the added volume may be performed as needed.

In other words, maintenance of power source equipment, ensuring of installing space, planning of an introduction schedule, and connection test are unnecessary, so that time can be shortened largely. Labor costs involved in the addition operation are also unneeded.

FIG. 9 shows initial invested volumes. In the prior art method, the user of the storage system plans a volume required for several years to meet a rapid increase of volume demand, and the volume must be purchased or borrowed at one time. In other words, the mounted volume of the system and a charged volume 71 are the same as an initial invested volume 72. A great deal of fund is required, and the investment burden is large to a user having a weak financial strength. On the other hand, in the present invention, a mounted volume 73 of the system is more than the user's addition intension, and a charged volume 74 is smaller than the mounted volume 73. An initial invested volume mounted volume 75 may be only the initial introduction volume, so as to reduce the initial investment.

Figure 10:
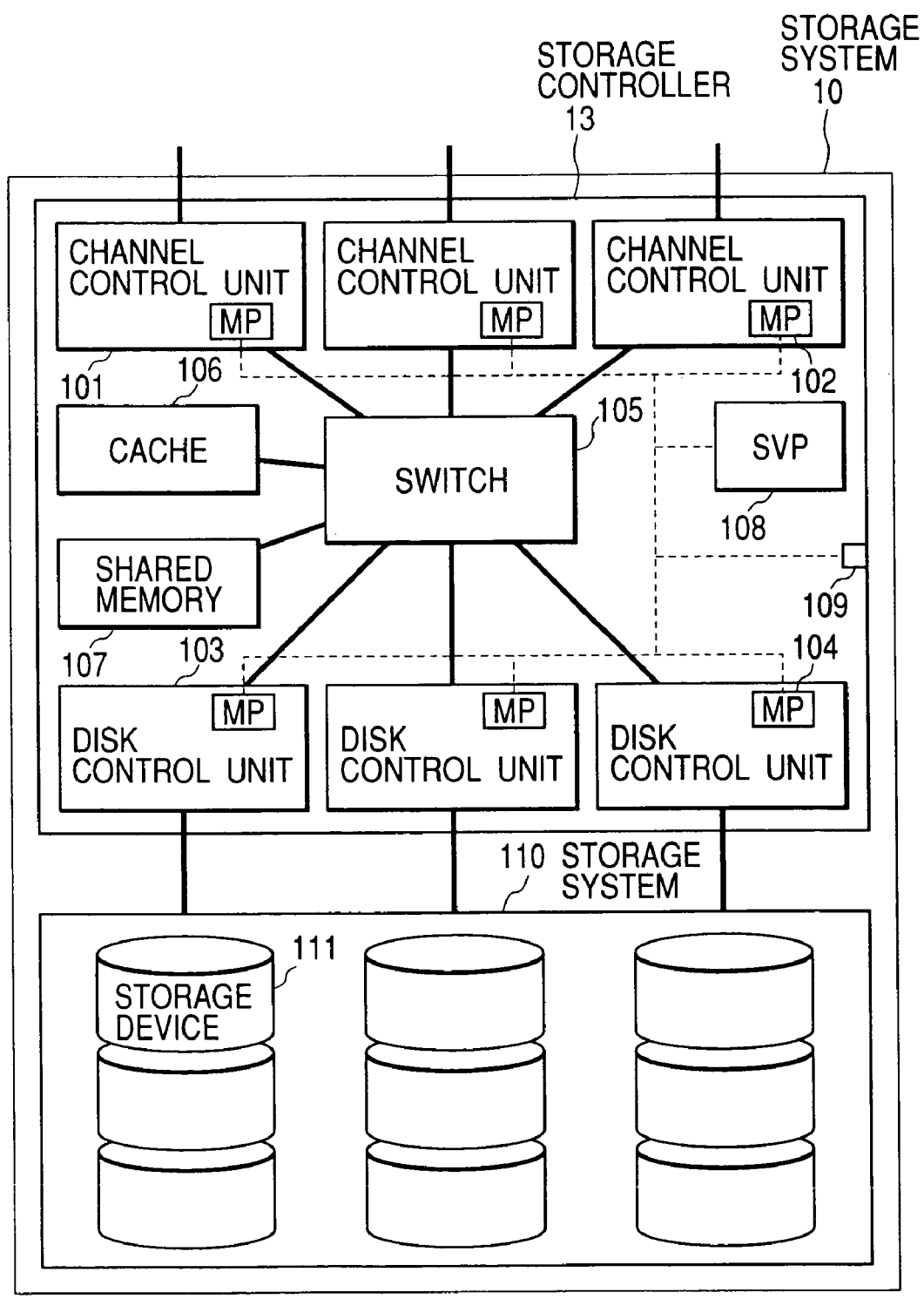
FIG. 10 is a diagram showing the hardware construction of the storage system of the present invention.

FIG. 10 is a hardware block diagram showing one example of the storage system 10 for realizing the above-mentioned embodiment.

The storage system 10 is provided with the storage controller 13 connected to a server or a host computer (hereinafter, called a server) and a storage system 110 consisting of a plurality of storage devices 111 for storing data from the server. The storage controller 13 consists of the next control unit or memory in order to control transferring data from the server to the storage system 110. A channel control unit 101 is connected to the server and responds to requests from the server. The channel control unit 101 transfers data transferred from the server to a cache memory 106 and transfers data stored in the cache memory 106 to the server. The channel control unit 101 incorporates a microprocessor (called an MP) 102 for performing these controls. A plurality of the channel control units 101 are mounted so as to be connected to a plurality of servers. A disk control unit 103 controls transferring and storing data from the server stored on the cache memory 106 to the storage device 111 and transferring data stored on the storage device 111 to the cache memory 106. The disk control unit 103 is equipped with a microprocessor 104 (called an MP) for performing these controls. A plurality of the disk control units are provided to expand the storage volume. The disk control unit 103 performs RAID control for making data redundant and storing the same.

The cache memory 106 is connected to the channel control unit 101 and the disk control unit 103. and temporality stores data from the server or data from the storage device 111. A shared memory 107 holds information of all the controls performed by the storage controller. The process is performed while the MPs of the channel control unit 101 or the disk control unit 103 accesses the shared memory 107.

An SVP 108 maintains the storage controller 13 and the storage system 110. In the SVP 108 of a large storage system, a generally used personal computer is used. The SVP 108 is connected to the MPs 102 of the channel control units 101 or the MPs 104 of the disk control units 103, instructs maintenance, and monitors the current failure of the storage controller. The SVP 108 and the MPs 102 and 104 are connected in an internal LAN. The numeral 109 in the drawing denotes a LAN port for connecting the external display terminal.

The relation to correspond the hardware construction of FIG. 10 with the above-mentioned FIG.1 will be described hereinbelow. The used volume management part 14 of FIG. 1 is performed by the MPs 102 and 104 of the channel control units 101 and the disk control units 103 of FIG.10. The operation part 15 of FIG.1 is performed by the SVP 108. The disk drive 11 and the disk drive 12 more than the user's increase intension consist of the storage device 111. The management table of FIG.2 is stored into the shared memory 107. The information management table example by users of the storage system shown in FIG.5 is stored into the shared memory 107.

Figure 11:
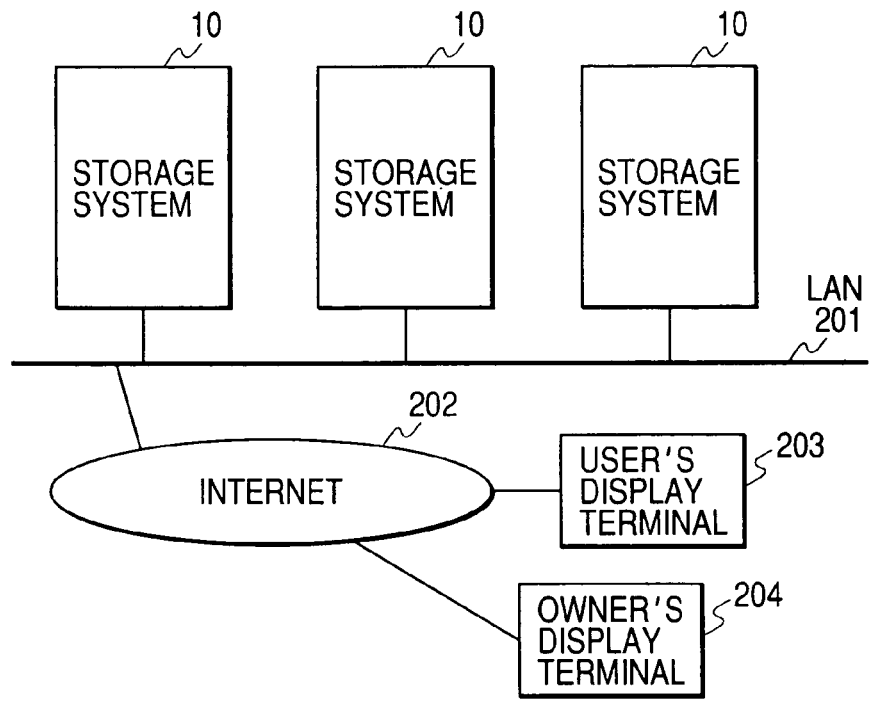
FIG. 11 is a diagram showing the rental charging system construction of the storage system of the present invention.

FIG. 11 shows the connection relation between the storage system 10, a user's display terminal 203 referred and set by the user, and an owner's display terminal 204 referred by the owner for charging management. The storage system 10 is installed in the user site of the storage system and is interconnected by LAN 201 in the user site. The LAN 201 is connected to Internet 202. The LAN 201 connected to the Internet 202 is actually protected by security such as a firewall. The user's display terminal 203 is connected to the storage system 10 via the Internet 202 and the LAN 201 so as to instruct, to the storage system, confirmation of the use state and used disk drive volume addition (hereinafter, called addition). The owner's display terminal 204 is connected to the storage system 10 via the Internet 202 and the LAN 201, and receives notification of the addition instruction performed by the user for charging management. The line 20 of FIG.1 corresponds to the Internet 202. The information display terminal by users 30 of the storage system of FIG. 1 corresponds to the owner's display terminal 204.

Using the construction shown in FIG. 11, a flowchart of the operation of the user's display terminal 203, the owner's display terminal 204, and the storage system 10.

Figure 12:
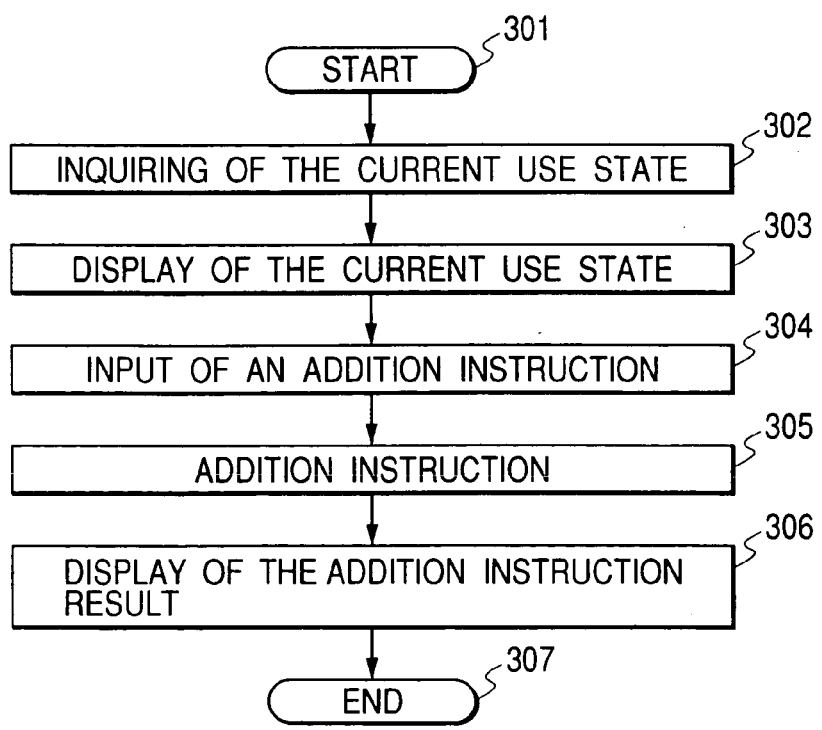
FIG. 12 is a flowchart for performing an addition instruction on a user's display terminal.
Figures 14, 15:
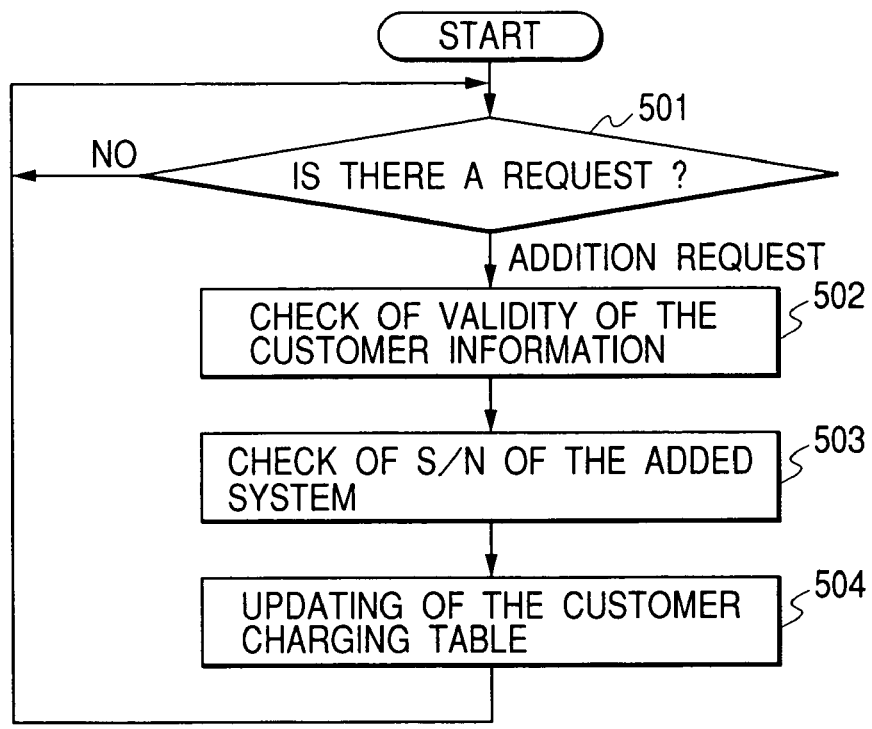
FIG. 14 is a flowchart for calculating a charge upon reception of an addition instruction on an owner's display terminal of the present invention.
FIG. 15 is an output screen example of the embodiment displayed on the user's display terminal of the present invention.

FIG.12 is a flowchart of the user's display terminal 203. Step 302 is a step for inquiring the current use state. The screen example is shown in FIG. 15.

Here is shown the screen for inputting a product type name 601 and a production number 602 of a product to be confirmed its use state, and a user support ID 603. The user support ID 603 is an ID for identifying the user and is the same as the user ID shown in FIG. 5. After input, an inquire button 604 is selected to access the targeted storage system and to require information acquisition. Step 303 of FIG. 12 is a step for displaying information acquired from the storage system. The screen example is shown in FIG.16.

Figure 16:
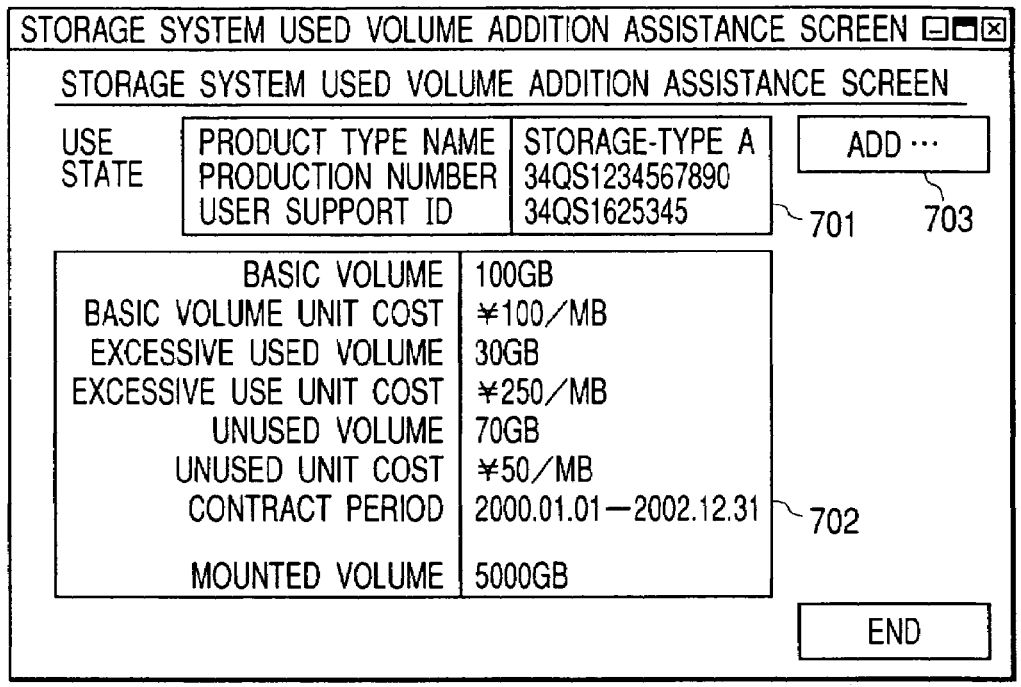
FIG. 16 is an output screen example of the embodiment displayed on the user's display terminal of the present invention.

FIG. 16 shows the screen example for displaying the inquired use state. The numeral 701 denotes an area for showing the inputted system and the inputted user ID in step 302. The numeral 702 denotes an area for displaying the current use state. Here, a basic volume, an excessive used volume, an unused volume, and a contract period are displayed. The contents are only an example, and data shown by the table structure of FIG.5 may be displayed. An add button 703 is a button to increase the used volume. When this is selected, the process continues to step 304.

Figure 17:
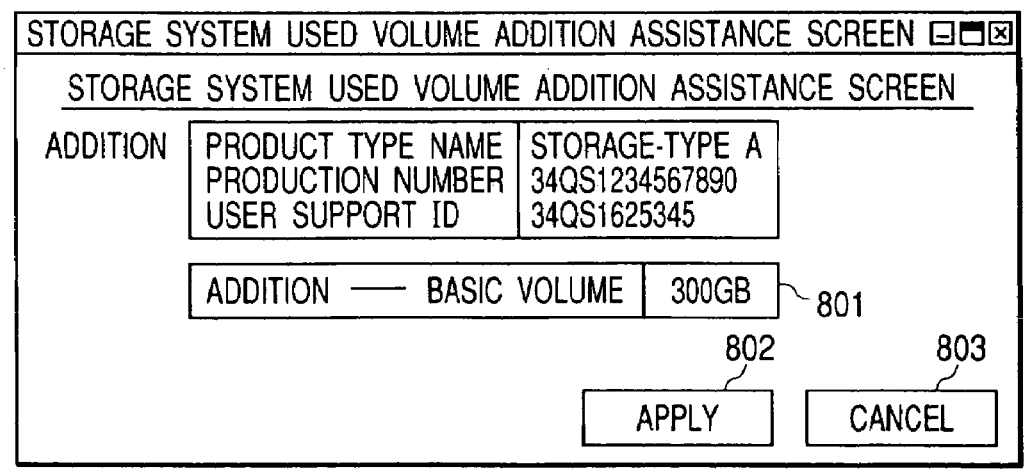
FIG. 17 is an output screen example of the embodiment displayed on the user's display terminal of the present invention.

Step 304 of FIG. 12 is a step for inputting an addition instruction. The screen example is shown in FIG. 17. Here is displayed a field 801 for inputting a basic volume to be added. The user inputs a volume to be added. After input, an apply button 802 is selected, and the process continues to the step 305.

Step 305 of FIG. 12 is a step for performing an addition instruction to the targeted storage system. The addition instruction is transmitted to the storage system together with the previously inputted volume. Based on the volume inputted on the storage system side, the addition process is performed to send the result. Step 306 is a step for displaying the result processed on the storage system 10 side. The screen example may be the same as that shown in FIG. 16. This allows the user to confirm whether the addition instruction result is reflected.

Figure 13:
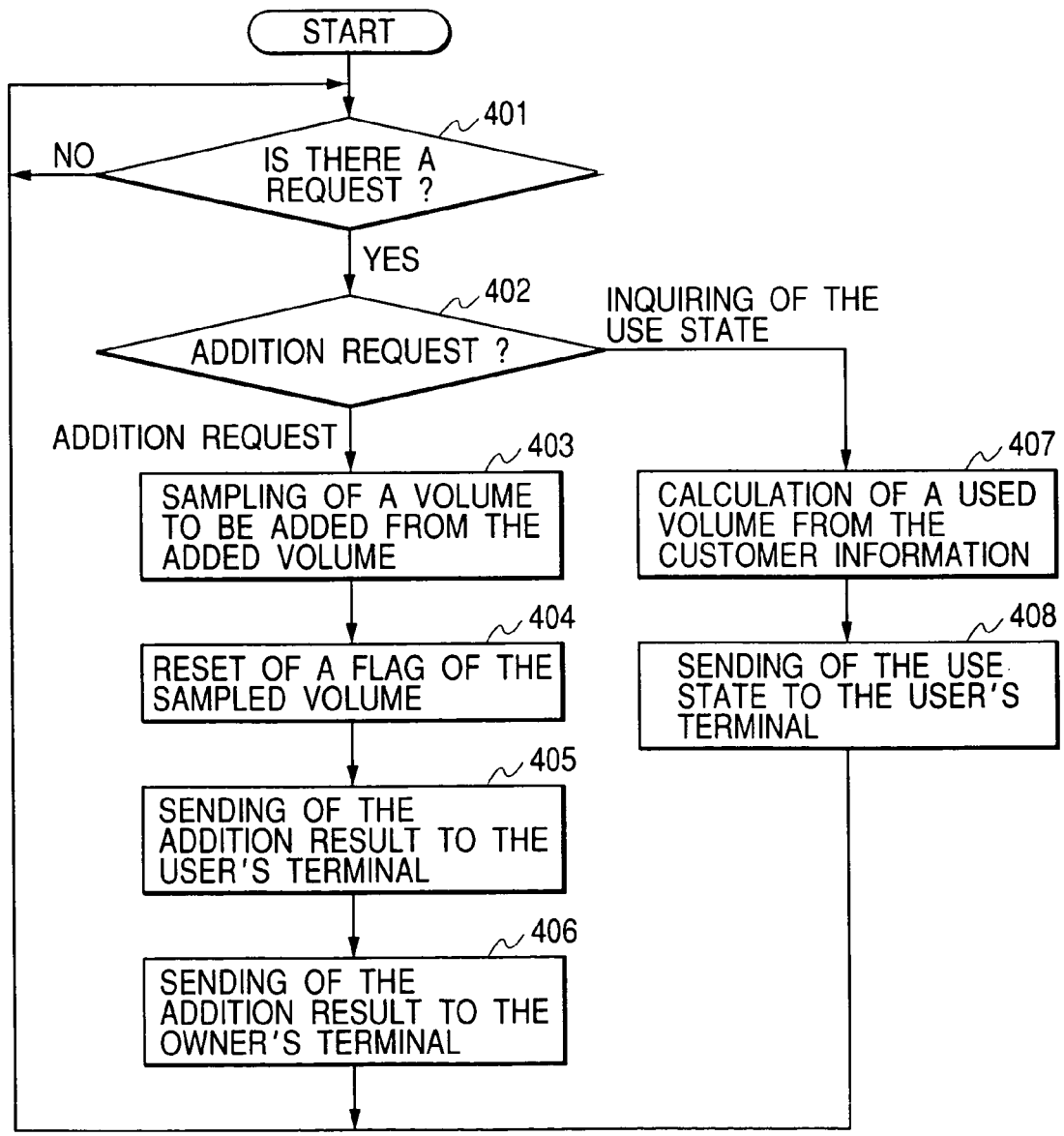
FIG. 13 is a flowchart for performing an addition process in the storage system of the present invention.

FIG. 13 shows a flowchart for performing an addition request process on the storage system 10 side. In step 401, whether there is an inquiry or an addition instruction from the user' terminal 203 is checked. When there is not such a request, the request is waited. When there is such a request, whether it is an addition request or an inquiry request is discriminated in step 402.

In step 403, when the request is an addition request, a volume to be added is transmitted from the user's terminal. The volume to be added is sampled. In step 404, the on-demand flag attribute of the management table shown in FIG. 2 is changed from "SET" to "RESET".

In step 405, the addition result including the current latest use state such as the volume increased is sent to the user's terminal 203. In step 406, the addition notification is reported to the owner's terminal 204. Step 407 is executed when the request is a use state inquiry. In step 407, a used volume is calculated based on the user support ID transmitted from the user's terminal 203. In step 408, the calculated result is sent to the user's terminal 203.

FIG. 14 shows a process flow of the owner's terminal 204. In step 501, whether there is an addition request from the storage system or not is checked. When there is not such a request, the addition request is waited. When there is an addition request, step 502 is executed. In step 502, the validity of the user support ID sent from the storage system 10 is checked. In step 503, the validity of the product number sent from the storage system 10 is checked. As a result of steps 502 and 503, when they are not valid, the notification is sent immediately to the storage system 10, and the display of the notification that the volume addition is impossible is transferred to the user's terminal 203. In step 504, the customer charging table managed based on the user support ID is updated. The customer charging table, not shown, is a normal customer database. When new charging occurs by the addition instruction, charging calculation is performed based on the volume added from the instruction date for charging and payment to the customer.

According to the present invention, the owner of the storage system can provide easy and timely volume addition to the user's volume increase demand.

Further, according to the present invention, the user of the storage system can reduce the initial investment and greatly shorten time required for volume addition. An opportunity to review the volume construction and the charged cost on a fixed period basis is provided to add optimal hardware at the point.

Furthermore, according to the present invention, the owner of the storage system can promote expansion of the user's used volume and increase frequency. It can be expected that the user's future disk demand and potential volume demand are dug up, leading to business.

What is claimed is:

1. In a system having a storage system that is owned by an owner and rented to a user, a method for renting and charging for the use of the storage system comprising the steps of:
   providing the user with an initial volume of storage space of the storage system, the storage system being held at a site of the user and not at a site of the owner, wherein the storage system held at the user's site has a management table which stores information regarding a state of use of disk drives, and wherein the owner obtains information of the management table from the user's site;
   charging the user for use of the initial volume at a predetermined rate;
   providing an additional volume of storage space of the storage system as needed by the user; and
   charging the user for a portion of the additional volume that is actually used by the user at a first rate and charging the user for a remainder of the additional volume that is not actually used by the user at a second rate different from the first rate,
   wherein the owner of the storage system is notified when the user begins using a portion of the additional volume.

2. The method according to claim 1, wherein the charging to the user for the additional volume according to the first and second rates occurs after a fixed period of time determined by a contract.

3. The method according to claim 1, wherein the state of use information stored in the management table is used in order to determine how much the user is to be charged for renting the storage system.

4. The method according to claim 1, further comprising the steps of:
   providing a display terminal to the user; and
   providing a display terminal to the owner;
   wherein both the user's display terminal and owner's display terminal are connected to the storage system via the internet so that both terminals can receive information regarding the state of use of the storage system by the user.

5. The method according to claim 2, wherein the state of use information stored in the management table is used in order to determine how much the user is to be charged for renting the storage system.

6. The method according to claim 5, further comprising the steps of:
   providing a display terminal to the user; and
   providing a display terminal to the owner;
   wherein both the user's display terminal and owner's display terminal are connected to the storage system via the internet so that both terminals can receive information regarding the state of use of the storage system by the user.

7. A method for renting and charging for the use of a storage system to a user by an owner of the storage system, the method comprising the steps of:
   providing the storage system at a site of the user, the storage system having a management table which stores information regarding a state of use of disk drives;
   providing access to the management table by the owner;
   providing the user with an initial volume of storage space of the storage system,
   charging the user for use of the initial volume at a first rate;
   providing the user with an additional volume of storage space of the storage system;
   charging the user for a portion of the additional volume that is actually used by the user at a second rate and charging the user for a remaining portion of the additional volume that is not actually used by the user at a third rate different from the second rate; and
   notifying the owner of the storage system when the user begins using a portion of the additional volume.

8. The method according to claim 7, wherein the charging to the user for the additional volume according to the second and third rates occurs after a fixed period of time determined by a contract.

9. The method according to claim 7, wherein the state of use information stored in the management table is used in order to determine how much the user is to be charged for renting the storage system.

10. The method according to claim 7, further comprising the steps of:
    providing a display terminal to the user; and
    providing a display terminal to the owner;
    wherein both the user's display terminal and owner's display terminal are connected to the storage system via the internet so that both terminals can receive information regarding the state of use of the storage system by the user.

11. The method according to claim 8, wherein the state of use information stored in the management table is used in order to determine how much the user is to be charged for renting the storage system.

12. The method according to claim 11, further comprising the steps of:
    providing a display terminal to the user; and
    providing a display terminal to the owner;
    wherein both the user's display terminal and owner's display terminal are connected to the storage system via the internet so that both terminals can receive information regarding the state of use of the storage system by the user.

13. A method for renting and charging for the use of a storage system to a user by an owner of the storage system, the method comprising the steps of:

providing the storage system at a site of the user, the storage system having a management table which stores information regarding a state of use of disk drives;

providing access to the management table by the owner;

providing the user with a volume of storage space of the storage system;

charging the user for a portion of the volume that is actually used by the user at a first rate and charging the user for a remaining portion of the volume that is not actually used by the user at a second rate different from the first rate; and notifying the owner of the storage system when the user begins using a portion of the volume.

14. The method according to claim 13, wherein the charging to the user for the volume according to the first and second rates occurs after a fixed period of time determined by a contract.

15. The method according to claim 13, wherein the state of use information stored in the management table is used in order to determine how much the user is to be charged for renting the storage system.

16. The method according to claim 13, further comprising the steps of:

providing a display terminal to the user; and providing a display terminal to the owner;

wherein both the user's display terminal and owner's display terminal are connected to the storage system via the internet so that both terminals can receive information regarding the state of use of the storage system by the user.

17. The method according to claim 14, wherein the state of use information stored in the management table is used in order to determine how much the user is to be charged for renting the storage system.

18. The method according to claim 17, further comprising the steps of:

providing a display terminal to the user; and providing a display terminal to the owner;

wherein both the user's display terminal and owner's display terminal are connected to the storage system via the internet so that both terminals can receive information regarding the state of use of the storage system by the user.

* * * * *